US005792972A

United States Patent [19]

Houston

[11] Patent Number: 5,792,972

[45] Date of Patent: Aug. 11, 1998

[54] METHOD AND APPARATUS FOR CONTROLLING THE TEMPO AND VOLUME OF A MIDI FILE DURING PLAYBACK THROUGH A MIDI PLAYER DEVICE

[75] Inventor: Scott J. Houston, Indianapolis, Ind.

[73] Assignee: Muse Technologies, Inc., Indianapolis, Ind.

[21] Appl. No.: 735,192

[22] Filed: Oct. 25, 1996

[51] Int. Cl.$^6$ .............................. G09B 15/02; G10H 1/46; G10H 7/00

[52] U.S. Cl. .............................. 84/645; 84/633; 84/477 R; 84/DIG. 6

[58] Field of Search .............................. 84/612, 636, 645, 84/652, 668, 714, DIG. 12, 633, 477 R, 478, DIG. 6

[56] References Cited

U.S. PATENT DOCUMENTS

| | | | |
|---|---|---|---|
| 4,476,764 | 10/1984 | Nishimoto et al. . | |
| 4,700,604 | 10/1987 | Morikawa et al. . | |
| 4,969,384 | 11/1990 | Kawasaki et al. . | |
| 5,127,303 | 7/1992 | Tsumura et al. | 84/645 X |
| 5,220,120 | 6/1993 | Mukaino . | |
| 5,227,574 | 7/1993 | Mukaino . | |
| 5,382,750 | 1/1995 | Masahiko et al. . | |
| 5,429,023 | 7/1995 | Imaizumi . | |
| 5,453,570 | 9/1995 | Umeda et al. . | |

OTHER PUBLICATIONS

User's Guide—Gateway 2000 Sound Card Soundblaster 16 Copyright ©1994.

*Primary Examiner*—Stanley J. Witkowski
*Attorney, Agent, or Firm*—Maginot, Addison & Moore

[57] ABSTRACT

A method and apparatus for controlling a tempo and volume of a MIDI file having a plurality of MIDI instructions stored on a computer-readable medium are disclosed. The method includes the computer-implemented steps of incrementing a counter at a first rate, transferring one or more of the MIDI instructions to a general MIDI-compatible device at the first rate, receiving an input signal from a data input device, determining a first increment value when the input signal is received, determining a first average value from the first increment value and a predetermined number of second increment values; and transferring one or more of the MIDI instructions to the general MIDI-compatible device at a second rate when the first average value has a predetermined logical relationship to a second average value.

28 Claims, 6 Drawing Sheets

150

```
Title:America the Beautiful
MpT:1 TpQ:480 MpQ:500.000000 BpM:120

Delta( 0 ) Time( 4/4   CPC( 24 ) Q32s( 8 ) QtoB( 1.000000 )
Delta( 0 ) Key( 00: C    MM( 00: Minor )
Delta( 0 ) Tempo( 500 Milliseconds/QtrNote
Delta( 1440 ) Lyric(  "O" ) Len( 1 ) Flags( 05 )               <- 154
Delta( 1440 ) FN( 90: Note On  ) P1( 43: G4 ) P2( 5A )          } 152
Delta( 1440 ) FN( 90: Note On  ) P1( 2B: G2 ) P2( 40 )
Delta( 1440 ) FN( 90: Note On  ) P1( 3B: B3 ) P2( 40 )
Delta( 1440 ) FN( 90: Note On  ) P1( 35: F3 ) P2( 40 )
Delta( 1440 ) FN( 90: Note On  ) PI( 3F: D#4) P2( 40 )
Delta( 1920 ) Lyric( "beau" ) Len( 4 ) Flags( 00 )             <- 154
Delta( 1920 ) FN( 80: Note Off ) P1( 43: G4 ) P2( 40 )          } 152
Delta( 1920 ) FN( 90: Note On  ) P1( 43: G4 ) P2( 5A )
Delta( 1920 ) FN( 80: Note Off ) P1( 2B: G2 ) P2( 40 )
Delta( 1920 ) FN( 90: Note On  ) P1( 24: C2 ) P2( 40 )
Delta( 1920 ) FN( 80: Note Off ) P1( 3B: B3 ) P2( 40 )
Delta( 1920 ) FN( 80: Note Off ) P1( 3F: D#4) P2( 40 )
Delta( 1920 ) FN( 80: Note Off ) P1( 35: F3 ) P2( 40 )
Delta( 1920 ) FN( 90: Note On  ) P1( 37: G3 ) ~2( 40 )
Delta( 1920 ) FN( 90: Note On  ) P1( 40: E4 ) P2( 40 )
Delta( 1920 ) FN( 90: Note On  ) P1( 34: E3 ) P2( 40 )
Delta( 2640 ) Lyric( "ti" ) Len( 2 ) Flags( 00 )               <- 154
Delta( 2640 ) FN( 80: Note Off ) P1( 43: G4 ) P2( 40 )          } 152
Delta( 2640 ) FN( 90: Note On  ) P1( 40: E4 ) P2( 5A )
Delta( 2640 ) FN( 80: Note Off ) P1( 24: C2 ) P2( 40 )
Delta( 2640 ) FN( 90: Note On  ) P1( 24: C2 ) P2( 40 )
Delta( 2640 ) FN( 80: Note Off ) P1( 37: G3 ) P2( 40 )
Delta( 2640 ) FN( 80: Note Off ) P1( 34: E3 ) P2( 40 )
Delta( 2640 ) FN( 80: Note Off ) P1( 40: E4 ) P2( 40 )
Delta( 2640 ) FN( 90: Note On  ) P1( 34: E3 ) P2( 40 )
Delta( 2640 ) FN( 90: Note On  ) P1( 37: G3 ) P2( 40 )
Delta( 2640 ) FN( 90: Note On  ) P1( 3C: C4 ) P2( 40 )
Delta( 2880 ) Lyric( "ful" ) Len( 3 ) Flags( 04 )              <- 154
Delta( 2880 ) FN( 80: Note Off ) P1( 40: E4 ) P2( 40 )          } 152
Delta( 2880 ) FN( 90: Note On  ) P1( 40: E4 ) P2( 5A )
Delta( 2880 ) FN( 80: Note Off ) F1( 24: C2 ) P2( 40 )
Delta( 2880 ) FN( 90: Note On  ) P1( 24: C2 ) P2( 40 )
Delta( 2880 ) FN( 80: Note Off ) P1( 34: E3 ) P2( 40 )
Delta( 2880 ) FN( 80: Note Off ) P1( 3C: C4 ) P2( 40 )
Delta( 2880 ) FN( 80: Note Off ) P1( 37: G3 ) P2( 40 )
Delta( 2880 ) FN( 90: Note On  ) Pi( 37: G3 ) P2( 40 )
Delta( 2880 ) FN( 90: Note On  ) P1( 3C: C4 ) P2( 40 )
Delta( 2880 ) FN( 90: Note On  ) P1( 34: E3 ) P2( 40 )
Delta( 3360 ) Lyric  "For" ) Len( 3 ) Flags( 04 )              <- 154
Delta( 3360 ) FN( 80: Note Off ) P1( 40: E4 ) P2( 40 )          } 152
Delta( 3360 ) FN( 90: Note On  ) P1( 43: G4 ) P2( 5A )
Delta( 3360 ) FN( 80: Note Off ) P1( 24: C2 ) P2( 40 )
pelta( 3360 ) FN( 90: Note On  ) P1( 25: C#2) P2( 40 )
Delta( 3360 ) FN( 80: Note Off ) P1( 37: G3 ) P2( 40 )
Delta( 3360 ) FN( 80: Note Off ) P1( 34: E3 ) P2( 40 )
Delta( 3360 ) FN( 80: Note Off ) P1( 3C: C4 ) P2( 40 )
Delta( 3360 ) KN( 90: Note On  ) P1( 37: G3 ) P2( 40 )
Delta( 3360 ) FN( 90: Note On    Pi( 3A: A#3) P2( 40 )
Delta( 3360 ) FN( 90: Note On    PI( 34: E3 ) P2( 40 )
Delta( 3840 ) Lyric( "spa"  Len( 3   Flags  00 )               <- 154
Delta( 3840 ) FN( 80: Note Off ) Pi( 43: G4 ) P2( 40 )          } 152
Delta( 3840 ) FN( 90: Note On  ) P1( 43: G4 ) P2( 5A )
Delta( 3840 ) FN( 80: Note Off ) P1( 25: C#2) P2( 40 )
Delta( 3840 ) FN( 90: Note On  ) P1( 26: D2 ) P2( 40 )
Delta( 3840 ) FN( 80: Note Off ) P1( 37: G3 ) P2( 40 )
```

FIG. 4

METHOD AND APPARATUS FOR CONTROLLING THE TEMPO AND VOLUME OF A MIDI FILE DURING PLAYBACK THROUGH A MIDI PLAYER DEVICE

BACKGROUND OF THE INVENTION

The present invention relates generally to a MIDI player device, and more particularly to a method and apparatus for controlling the tempo and volume of a MIDI file during playback through a MIDI player device that is executing on a computer.

MIDI (Musical Instrument Digital Interface) is a known serial interface standard for interconnecting music synthesizers, musical instruments and computers. The MIDI standard is based partly on hardware, and partly on a description of the way in which music and sound are encoded and communicated between MIDI devices. The hardware portion of the standard defines MIDI input/output (I/O) ports, namely MIDI In, MIDI Out and MIDI Thru. A synthesizer or other MIDI device receives MIDI messages via the MIDI In port. MIDI messages are also echoed back out through the MIDI Thru port so that other MIDI devices can receive the MIDI messages. MIDI devices send their own MIDI messages to other devices via the MIDI Out port.

The information transmitted between MIDI devices is in the form of MIDI messages which encode different aspects of sound such as pitch and volume as 8-bit bytes of digital information. MIDI devices can be used for creating, recording and playing back music that is stored as a MIDI file (multiple MIDI messages). Using the MIDI standard, sound cards in computers, synthesizers, and sequencers can communicate with each other, either keeping time or actually controlling the music created by other connected equipment.

That is, known MIDI player devices which play musical works that are encoded as MIDI files, typically play the musical works at a particular rate or tempo which has been encoded directly into the MIDI file. For example, a particular song encoded as a MIDI file may include one or more MIDI messages which set forth a beat or time as 4/4 time, and set forth a tempo of 500 milliseconds/quarter note. Thus, during playback of the song, a MIDI player device may be instructed as to how fast or how slow to play the selected song.

In addition, known MIDI player devices typically play musical works at a particular default volume which has been encoded directly into the MIDI file. It should be appreciated that the volume level encoded into a MIDI file is subject to an absolute volume level which may be set by moving a mechanical volume knob or slider associated with the MIDI player device.

With the proliferation of home computers as a source of entertainment, MIDI player software products have been developed which, when executed on a computer, permit the playback of general or standard MIDI files through a sound card associated with the computer. That is, a known MIDI player software product may configure a computer to function as a MIDI player device, wherein a user may insert a computer disk containing general MIDI files into a computer and initiate the playback of a song that is encoded as a general MIDI file on the disk, through an audio speaker(s) associated with the computer.

A variation of known MIDI player software products, are karaoke software products which, like MIDI player software products, permit the playback of MIDI files through a sound card associated with a computer. However, known karaoke software products also permit lyrics to be displayed on a display monitor associated with the computer as a song is played back. The lyrics may be embedded within a MIDI karaoke file in a known manner.

One problem associated with known MIDI player software products is that, apart from a user selecting a song for playback, MIDI player software products are not interactive. That is, relative to MIDI player software products, a user may only passively sit back and listen to the melody of the song being played through the audio speaker(s) associated with a computer. Karaoke software products are at least minimally interactive in that a user may read or sing the accompanying lyrics while the melody of a song is played at a pre-selected tempo.

What is needed therefore is a MIDI player software product which provides more than the ability to simply playback, or sing-along with a song. In particular, what is needed is a MIDI player software product which permits a user to interact with a computer during playback of a song such that the user may in fact perform the song by actually controlling the tempo and volume of the song as the song is played in real time.

SUMMARY OF THE INVENTION

In accordance with one embodiment of the present invention, there is provided a method for controlling a tempo of a MIDI file having a plurality of MIDI instructions stored on a computer-readable medium. The method includes the computer-implemented steps of incrementing a counter at a first rate, transferring one or more of the MIDI instructions to a general MIDI-compatible device at the first rate, receiving an input signal from a data input device, determining a first increment value when the input signal is received, determining a first average value from the first increment value and a predetermined number of second increment values; and transferring one or more of the MIDI instructions to the general MIDI-compatible device at a second rate when the first average value has a predetermined logical relationship to a second average value.

Pursuant to another embodiment of the present invention, there is provided a method for controlling a tempo of a MIDI file having a plurality of MIDI instructions stored on a computer-readable medium wherein the method includes the computer-implemented steps of incrementing a counter at a first rate, transferring one or more of the MIDI instructions to a general MIDI-compatible device at the first rate, receiving an input signal from a data input device, determining a first count value of the counter when the input signal is received, and transferring one or more of the MIDI instructions to the general MIDI-compatible device at a second rate when the first count value has a predetermined logical relationship to a second count value associated with a lyric instruction to be executed.

Pursuant to a further embodiment of the present invention, there is provided a computer system configured to permit a user to control a tempo of a MIDI file having a plurality of MIDI instructions stored on a computer-readable medium. The computer system includes a processor, and a memory coupled to the processor wherein the memory has stored therein a sequence of instructions which, when executed by the processor, cause the processor to perform the steps of incrementing a counter at a first rate, transferring one or more of the MIDI instructions to a general MIDI-compatible device at the first rate, receiving an input signal from a data input device, determining a first increment value when the input signal is received, determining a first average value from the first increment value and a predetermined number of second increment values, and transferring one or more of the MIDI instructions to the general MIDI-compatible device at a second rate when the first average value has a predetermined logical relationship to a second average value.

Pursuant to a yet another embodiment of the present invention, there is provided a computer system configured to permit a user to control a tempo of a MIDI file having a plurality of MIDI instructions stored on a computer-readable medium. The computer system includes a processor, and a memory coupled to the processor wherein the memory has stored therein a sequence of instructions which, when executed by the processor, cause the processor to perform the steps of incrementing a counter at a first rate, transferring one or more of the MIDI instructions to a general MIDI-compatible device at the first rate, receiving an input signal from a data input device, determining a first count value of the counter when the input signal is received, and transferring one or more of the MIDI instructions to the general MIDI-compatible device at a second rate when the first count value has a predetermined logical relationship to a second count value associated with a lyric instruction to be executed.

It is therefore an object of the present invention to provide a new and useful method of controlling a tempo and volume of a MIDI file having a plurality of MIDI instructions stored on a computer-readable medium.

It is another object of the present invention to provide an improved method of controlling a tempo and volume of a MIDI file having a plurality of MIDI instructions stored on a computer-readable medium.

It is another object of the present invention to provide a new and useful computer system configured to permit a user to control a tempo and volume of a MIDI file having a plurality of MIDI instructions stored on a computer-readable medium.

It is another object of the present invention to provide an improved computer system configured to permit a user to control a tempo and volume of a MIDI file having a plurality of MIDI instructions stored on a computer-readable medium.

The above and other objects, features, and advantages of the present invention will become apparent from the following description and the attached drawings.

BRIEF DESCRIPTION OF THE DRAWINGS

FIG. 4 is printout showing a portion of an exemplary MIDI file representing the song titled "America the Beautiful";

DETAILED DESCRIPTION OF THE PREFERRED EMBODIMENT

Figure 1:
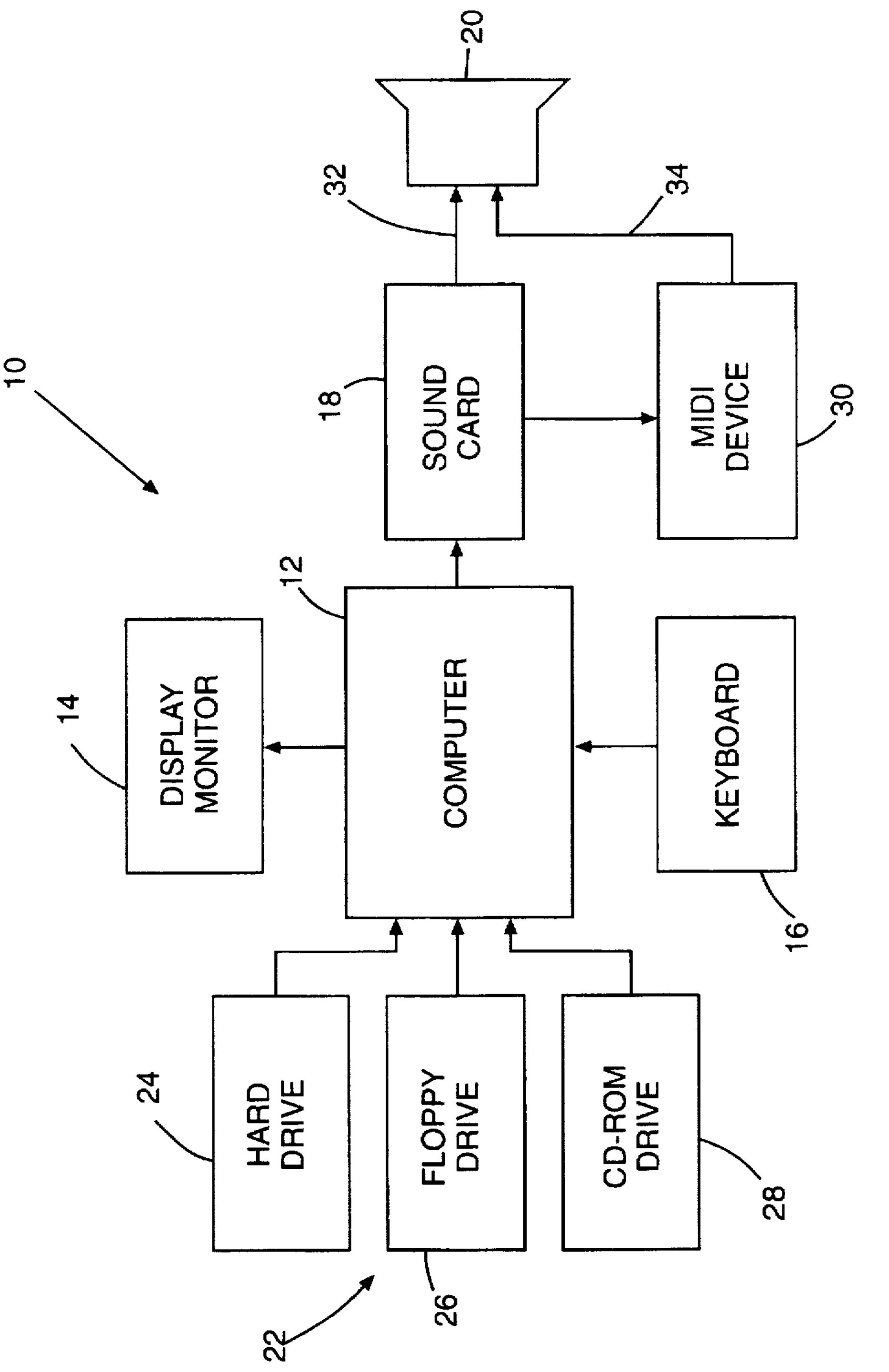
FIG. 1 is a block diagram of a general purpose computer system which is capable of running or otherwise executing a MIDI player software product which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a general purpose computer system 10 which is capable of running or otherwise executing a MIDI player device which incorporates the features of the present invention therein. The computer system 10 may include a computer 12, display monitor 14, a data input device 16 such as a keyboard and/or mouse, sound card 18, one or more audio speakers 20, and one or more peripheral storage devices 22 such as a hard drive 24, floppy drive 26 or CD-ROM drive 28. A general MIDI-compatible device 30 such as a sound module or MIDI instrument, may optionally be connected to a standard MPU-401 port (not shown) of the sound card 18, or may be directly coupled to the computer 12 through a conventional port of the computer 12.

It should be appreciated that if the MIDI player software product is loaded onto an Apple-Macintosh computer, then the sound card 18 would be replaced in favor of the open music system (OMS) software associated with the Macintosh computer. The OMS software serves to direct MIDI instructions to the MIDI device 30, or to a software-based MIDI device or synthesizer such as "QUICK-TIME™ Musical Instruments" extension.

The MIDI player software product, hereinafter referred to as a "MIDI player device", may be conventionally loaded into a main memory (RAM) associated with the computer 12 from one of the storage devices 22. As described in greater detail below, the MIDI player device permits a user to playback or to perform a song via the data input device 16 and a graphical user interface which is displayed on the display monitor 14 when the MIDI player device is executed. The song to be played back or performed may be stored as a conventional MIDI file on any one or more of the storage devices 22, or may be downloaded through communication software in a known manner.

The sound card 18 may be a known add-in circuit board which includes circuitry responsive to an FM synthesizer software driver for driving the audio speaker 20 with an analog audio output signal on an audio cable 32. The analog audio output signals are generated by the sound card 18 in response to a MIDI instruction received from the computer 12 under the direction of the MIDI player device. An exemplary sound card is the Sound Blaster 16 which is commercially available from Gateway 2000, Inc. of N. Sioux City, South Dakota. Alternatively, the sound card 18 may pass the MIDI instruction received from the computer 12 to the MIDI device 30 through a standard output port such as an MPU-401 port. The MIDI device 30 may utilize a wave-table synthesizer software driver to generate an analog audio output signal on an audio cable 34 for driving the audio speaker 20.

It should be appreciated that the sound card 18 may include an audio daughter board (not shown) which provides a wave-table synthesizer software driver for generating an audio output signal on audio cable 32. An exemplary audio daughter board is the WaveForce DB50XG model which is commercially available from Yamaha Corp. Alternatively, the sound card 18 may include a wave-table synthesizer software driver integrated therein. An exemplary sound card having an integrated wavetable synthesizer is the Wave-Force SW60XG model which is also commercially available from Yamaha Corp.

Figure 2:
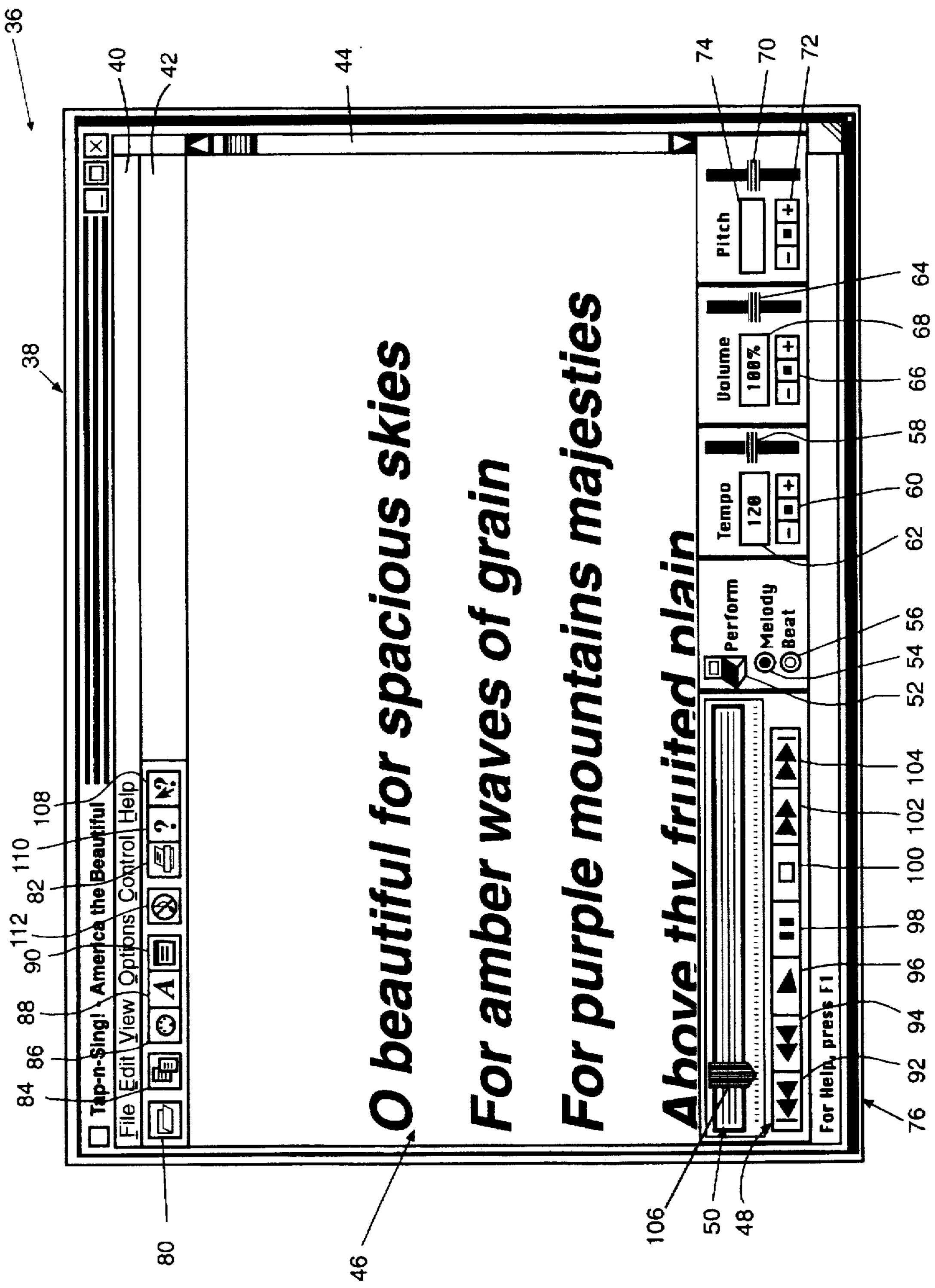
FIG. 2 shows a graphical user interface which is displayed on the display monitor shown in FIG. 1.

Referring now to FIG. 2, there is shown a graphical user interface (GUI) 36 which is displayed on the display monitor 14 by the MIDI player device when executing on the computer 12. The GUI 36 includes a main display screen or window 38 having a menu bar 40, tool bar 42, scroll bar 44, lyric screen or window 46, transport control strip 48, track bar 50, perform toggle switch 52, melody button 54, beat button 56, tempo slider 58, tempo adjust buttons 60, tempo display 62, volume slider 64, volume adjust buttons 66, volume display 68, pitch slider 70, pitch adjust buttons 72, pitch display 74, and status bar 76.

The menu bar 40 contains a number of user-selectable pull-down menus such as File, Edit, View, Options, Control and Help. The menus may be opened via the keyboard or mouse 16 to display various user-selectable commands. When the File menu is opened, a user may select from an Open, Print, Print Preview, Print Setup, "1, 2, 3, 4", or Exit/Quit command through the keyboard or mouse 16. The Open command may be used to open an existing MIDI-karaoke or general MIDI file in the main window 38. If lyrics are included with the MIDI file (i.e. MIDI karaoke file), the lyrics will be displayed in the lyric window 46. If the MIDI player device does not detect lyrics embedded in the opened MIDI file, then a message may be displayed in the lyric window 46 stating that the MIDI file contains no lyrics. A MIDI file may be opened in a similar manner by selecting an Open button 80 from the tool bar 42.

The Print command may be used to print the lyrics displayed in the lyric window 46. When the Print command is selected, a Print dialog box is displayed which permits a user to select the range of pages to be printed, the number of copies to be printed, the destination printer, and other known printer setup options. The Print dialog box may also be displayed by selecting a Print button 82 from the toolbar 42.

The Print Preview command may be used to display an active document as it would appear when printed. When the Print Preview command is selected, the main window 38 is replaced with a print preview window in which one or two pages may be displayed in a printed format. A print preview tool bar associated with the print preview window permits a user to view either one or two pages at a time; move back and forth through the document; zoom in and out of pages; and initiate a print job.

The Print Setup command may be used to select a printer and a printer connection, or to specify options available to a selected printer. When the Print Setup command is selected, the main window **38*a*** is replaced with a Print Set up dialog box which permits a user to specify a printer, printer connection or port and printer options. The 1, 2, 3, 4 command lists the last four MIDI files that were closed at the bottom of the File menu. Thus, the 1, 2, 3, 4 command may be used as a shortcut to open one of the last four MIDI files that were closed. The Exit/Quit command may be used to close or otherwise end the MIDI player device.

When the Edit menu is opened, a user may select a Copy command through the keyboard or mouse 16. The Copy command is used to copy selected lyrics onto a clipboard. The Copy command is not available when no lyrics are selected. The Copy command may also be invoked by selecting a Copy button 84 from the tool bar 42.

When the View menu is opened, a user may select either a Toolbar command or a Status Bar command through the keyboard or mouse 16. The Toolbar command may be used to display and hide the toolbar 42. A check mark may appear adjacent to the Toolbar command when the toolbar 42 is displayed. Likewise, the Status Bar command may be used to display and hide the status bar 76. The status bar 76 describes the action to be executed by the selected menu item or toolbar button. A check mark may appear adjacent to the Status Bar command when the status bar 76 is displayed.

When the Options menu is opened, a user may select either a MIDI Setup command or a Preferences command through the keyboard or mouse 16. The MIDI Setup command may be used to select the desired location or device (i.e. sound card 18, MIDI device 30, etc.) for the MIDI player device to send the MIDI performance data. After a device is selected, the device remains the default device until a new device is selected. When the MIDI Setup command is selected, a MIDI Setup window is displayed which permits a user to select from an Operating System MIDI Mapping Device, or an Installed Device Driver. The MIDI Setup window may also be displayed by selecting a Device Driver button 86 from the tool bar 42.

The Preferences command may be used to customize the appearance of the font used to display the lyrics, and to customize the colors displayed on the display monitor 14. When the Preferences command is selected, a Preferences window having a fonts tab and a colors tab is displayed. When the fonts tab is selected, a user may change the font, style and size of the font that will be displayed in the lyrics window 46. The fonts tab may also be displayed by selecting a fonts button 88 from the tool bar 42. When the colors tab is selected, a user may change the colors of the background, text, highlight, and jump. The colors tab may also be displayed by selecting a colors button 90 from the tool bar 42.

When the Control menu is opened, a user may select a Beginning, Rewind, Play, Pause, Stop, Forward or End command through the keyboard or mouse 16. The commands listed in the Control menu duplicate the function of the buttons displayed on the transport control strip 48. The Beginning command and a beginning button 92 reset a song to the beginning of a MIDI file. The Rewind command and a rewind button 94 rewind from the current position in the MIDI file. The Play command and a play button 96 playback the MIDI file from the current position. The Pause command and a pause button 98 pause playback, and hold at the current position in the MIDI file. The Stop command and a stop button 100 stop playback and return to the beginning of the MIDI file. The Forward command and a forward button 102 move forward from the current position in the MIDI file. The End Command and an end button 104 jump to the end of the MIDI file from the current position. A pointer or slider 106 associated with the track bar 50 advances from left to right in FIG. 2 so as to indicate the current playing position of the MIDI file during playback.

When the Help menu is opened, a user may select either a Help Topics command or an About command through the keyboard or mouse 16. When the Help Topics command is selected, a help window is displayed which provides an index of topics on which a user may obtain assistance. In addition, a conventional context-sensitive help button 108 may be selected from the tool bar 42. When the About command is selected, a screen opens up and displays the version number of the MIDI player device being executed on the computer 12. The about screen may also be displayed by selecting an about button 110 from the tool bar 42.

The toolbar 42 also contains an "all notes off" button 112 which sends an "all note off" signal to the sound card 18, MIDI device 30, etc. The "all notes off" button 112 may be used to mute a tone which is generated when, during playback, a song is stopped or paused (by using the stop button 100 or pause button 98) after the computer 12 sends a "note on" MIDI instruction to the sound card 18, MIDI device 30, etc. but before the computer 12 sends "note off" MIDI instructions to the sound card 18, MIDI device 30, etc.

When a MIDI file is loaded using the Open command from either the File menu on the menu bar 40 or the menu button 80 on the toolbar 42, the MIDI player device is set to a Play mode by default. Play mode is in effect whenever the perform toggle switch 52 is in a down or disabled position as shown in FIG. 2. When the perform toggle switch 52 is in the down position, the words "Perform", "Melody" and "Beat" are greyed-out and the melody button 54 and beat button 56 are un-selectable. In Play mode, the MIDI player device functions as a conventional MIDI player device to playback the currently open MIDI file at a preset tempo when the Play command from the Control menu or play button 92 is selected.

The preset tempo (i.e. the rate of speed at which a musical composition is, or is supposed to be played) is displayed in the tempo display 62 when the MIDI file is selected, and may be adjusted faster or slower with the tempo slider 58 or tempo adjustment buttons 60. That is, the preset tempo is loaded when the MIDI file is opened, and may be adjusted faster or slower with the tempo slider 58 or the tempo adjustment buttons 60. The tempo is adjusted up or down one beat per minute with each click of the (+) or (−) button, respectively. If a user clicks above or below a tab associated with the tempo slider 58, the tempo will be adjusted by five beats per minute. Clicking the center tempo adjustment button 60 resets the tempo to the preset level.

The volume slider 64 and volume buttons 66 adjust the volume level of the MIDI file being played back, as reflected by the volume display 68, subject to an absolute volume level set by the sound card 18, MIDI device 30, etc. The volume level of the sound card 18, MIDI device 30, etc. may be set via a mechanical volume knob or slider associated with the MIDI device 30, or a control panel screen associated with the sound card 18, or by using a master volume MIDI command which may be sent from the computer 12 to the sound card 18, or MIDI device 30.

The volume level of the MIDI file being played back, may also be adjusted, subject to the absolute volume level set by the sound card MIDI device 30, etc., by tapping certain keys of the keyboard 16. That is, if a user taps any of the keys in the lower middle row of the keyboard 16 (e.g. keys "A", "S", "D", "F", etc. of a standard QWERTY keyboard) the MIDI file will be played back at the default volume level that is encoded in the MIDI file. If a user taps any of the keys in the upper middle row of the keyboard 16 (e.g. keys "Q", "W", "E", "R", etc. of a standard QWERTY keyboard) the MIDI file will be played back at an increased volume level as indicated in the volume display 68. If a user taps any of the keys in the upper row of the keyboard 16 (e.g. keys "1", "2", "3", "4", etc. of a standard QWERTY keyboard) the MIDI file will be played back at an even greater volume level as indicated in the volume display 68.

Likewise, if a user taps any of the keys in the lower row of the keyboard 16 (e.g. keys "Z", "X", "C", "V", etc. of a standard QWERTY keyboard) the MIDI file will be played back at a decreased volume level as indicated in the volume display 68. If a user taps the SPACEBAR key of the keyboard 16, the MIDI file will be played back at an even softer volume level as indicated in the volume display 68.

Figure 3:
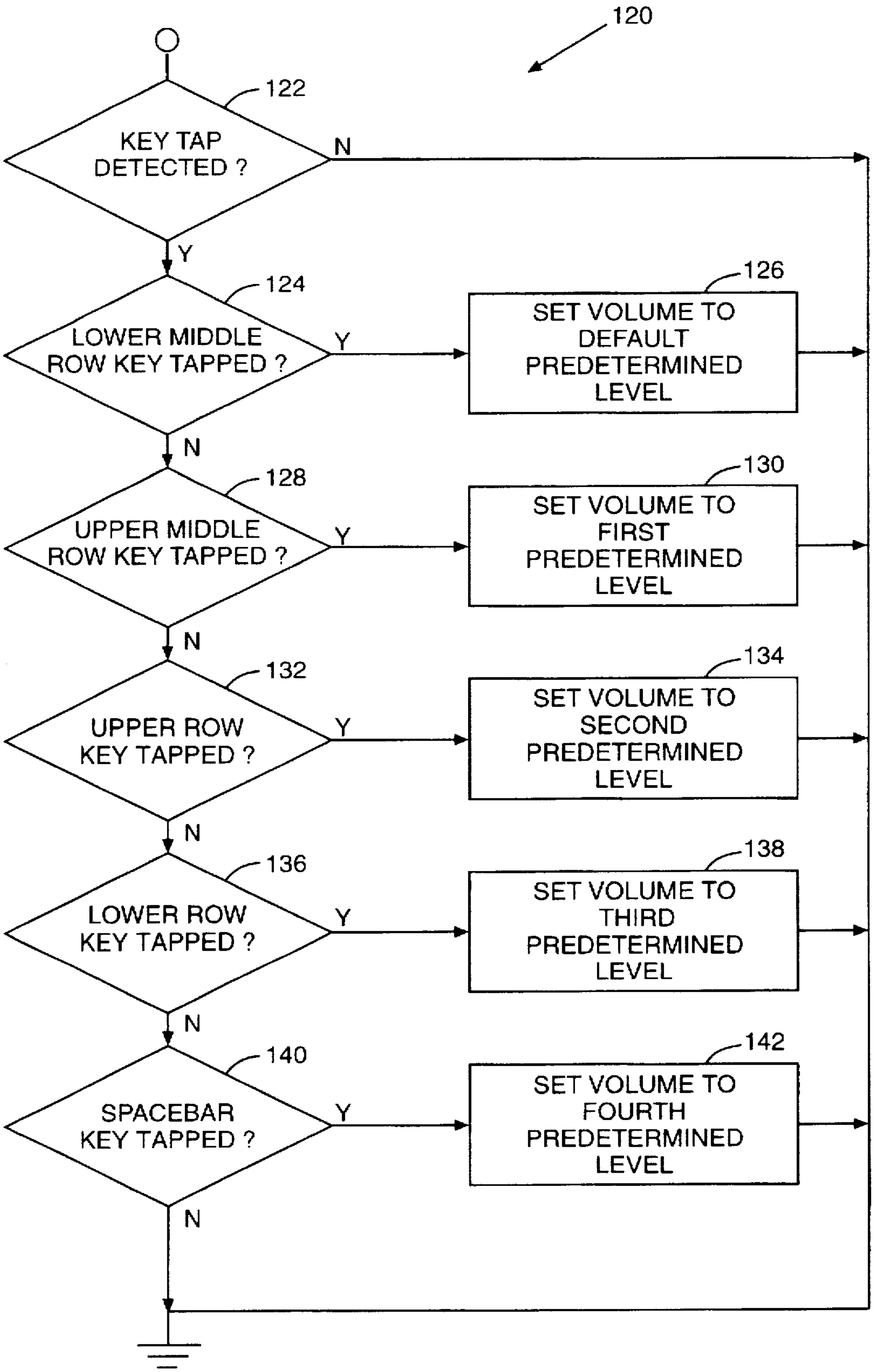
FIG. 3 is a flowchart setting forth an interrupt routine which adjusts the volume of a MIDI file being performed in response to a particular key tapped on a keyboard by a user.

FIG. 3 shows an exemplary interrupt routine 120 for adjusting the volume of the MIDI file being performed based on the particular key tapped by a user on the keyboard 16. The objective of the routine 120 is to identify a characteristic of the input signal sent to the computer 12 from the keyboard 16, and to adjust the volume level of the MIDI file being performed based on which key of the keyboard has been tapped. It should be appreciated that the computer 12 may determine which key has been tapped in a conventional and well known manner.

The routine 120 begins at step 122 wherein a determination is made as to whether a user has tapped a key associated with the keyboard 16. If the result of step 122 is NO, the routine 120 ends because it is determined that a key tap has not been detected. If the result of step 122 is YES, the routine 120 advances to step 124 where a determination is made as to whether the key tap that was detected in step 122 was from a key positioned in the lower middle row of the keyboard 16. If the result of step 124 is NO, the routine 120 advances to step 128. If the result of step 124 is YES, the routine 120 advances to step 126 where the volume is set to the default volume level embedded in the MIDI file being performed. After the volume level has been set in step 126, the routine 120 ends.

In step 128, a determination is made as to whether the key tap that was detected in step 122 was from a key positioned in the upper middle row of the keyboard 16. If the result of step 128 is NO, the routine 120 advances to step 132. If the result of step 128 is YES, the routine 120 advances to step 130 where the volume is set to a first predetermined volume level which is greater than the default volume level. After the volume level has been set in step 130, the routine 120 ends.

In step 132, a determination is made as to whether the key tap that was detected in step 122 was from a key positioned in the upper row of the keyboard 16. If the result of step 132 is NO, the routine 120 advances to step 136. If the result of step 132 is YES, the routine 120 advances to step 134 where the volume is set to a second predetermined volume level which is greater than the first predetermined volume level. After the volume level has been set in step 134, the routine 120 ends.

In step 136, a determination is made as to whether the key tap that was detected in step 122 was from a key positioned in the upper row of the keyboard 16. If the result of step 136 is NO, the routine 120 advances to step 140. If the result of step 136 is YES, the routine 120 advances to step 138 where the volume is set to a third predetermined volume level which is less than the default volume level. After the volume level has been set in step 138, the routine 120 ends.

In step 140, a determination is made as to whether the key tap that was detected in step 122 was from the SPACEBAR key of the keyboard 16. If the result of step 140 is NO, the routine 120 ends. If the result of step 140 is YES, the routine 120 advances to step 142 where the volume is set to a fourth predetermined volume level which is less than the third predetermined volume level. After the volume level has been set in step 142, the routine 120 ends.

The preset pitches (or key) of a MIDI file may be adjusted (or transposed) higher or lower with the pitch slider 70 or the pitch adjustment buttons 72. The pitch adjustment buttons 72 adjust the pitch of the musical composition played back by one half-step for each click of the (−) or (+) button. The value displayed in the pitch display 74 reflects the number of half-steps higher or lower than the preset pitch that was originally set in the MIDI file.

The MIDI player device may also be set to a Perform mode by clicking the upper portion of the perform toggle switch 52. When the Perform mode is selected, the MIDI player device creates the effect that a lamp in the upper portion of the perform toggle switch 52 is illuminated, the words "Perform", "Melody" and "Beat" are no longer greyed-out, and the melody button 54 and beat button 56 are now selectable.

When in Perform mode, the MIDI player device operates in either a Beat setting or a Melody setting. When the beat button 56 is selected, the MIDI player device operates in the Beat setting. When operating in the Beat setting, the MIDI player device plays back the selected MIDI file according to the tempo of the beat that a user taps on any one or more keys of the keyboard 16. In effect, the user serves as a musical conductor or a metronome when the MIDI player device operates in the Beat setting. That is, as a user speeds up or slows down the steady rate at which a keyboard key is tapped, the tempo of the MIDI file being played back speeds up or slows down accordingly. If a user stops tapping the keyboard 16, the MIDI player device will stop the playback of the MIDI file until the user resumes tapping the keyboard 16.

When a MIDI file is opened as described above, the MIDI player device provides a number of "count-off taps" to indicate to the user the pre-set tempo of the MIDI file to be played back. When the MIDI player device is in the Beat setting and a MIDI file is being played back, the tempo display 62 displays the tempo at which the user is tapping the keyboard 16.

The MIDI player device may only operate in the Melody setting when lyrics are embedded into the MIDI file (i.e. when a MIDI karaoke file is selected). The MIDI player device operates in the Melody setting when the melody button 54 is selected. When operating in the Melody setting, the MIDI player device plays back the MIDI file according to the tempo of the melody (i.e. lyrics) that a user taps on the keyboard 16. In the Melody setting, the user must tap once for every note in the melody of the MIDI file being played back. Typically, the user must tap the keyboard 16 once for every syllable of lyrics. Tapping the keyboard on every syllable is made intuitive for a user because the MIDI player device highlights a lyric as the melody of the song approaches the specific location in the MIDI file where the lyric is located. Thus, rather than tapping a steady beat on the keyboard 16 when the MIDI player device operates in the Beat setting, a user must tap the keyboard 16 according to the beat of the melody when the MIDI player device operates in the Melody setting.

FIG. 4 shows a portion of a MIDI karaoke file 150 for the song titled "America the Beautiful". The MIDI karaoke file 150 comprises two types of MIDI instructions, namely, note instructions 152 and lyric instructions 154. The note instructions 152 each having a start time field (Delta), a note function field (FN), a pitch field (P1), and a velocity field (P2) assigned thereto. The Delta field stores a count value (x) which represents a start time for the note instruction relative to a reference timer or counter (not shown) that begins to count upwardly when playback of the MIDI file is initiated. The FN field stores a note "on" or a note "off" instruction. The P1 field stores the musical note that is to be either turned on or turned off, depending upon the particular note instruction stored in the FN field. The P2 field stores a velocity value which represents the volume level that the musical note identified in the P1 field is to be either turned on at, or turned off at, depending upon the particular note instruction stored in the FN field.

If a note "on" instruction is stored in the FN field, then the velocity value stored in the P2 field represents the force that would be exerted in order to generate the note on an actual musical instrument. More particularly, the velocity value stored in the P2 field controls the volume of the note played back. For example, a larger velocity value represents hitting a keyboard harder, thus generating a louder note. A smaller velocity value represents tapping a keyboard lighter, thus generating a softer note. If a note "off" instruction is stored in the FN field, then the velocity value stored in the P2 field represents the rate at which the note is decayed when the note is turned off.

The lyric instructions 154 each have a start time field (Delta), a lyric field (Lyric), a length field (Len), and a flag field (Flags). As with the Delta field of the note instructions 152, the Delta field of the lyric instructions 154 stores a count value (x) which represents a start time for the lyric instruction relative to the reference counter. The Lyric field stores the lyric (word or syllable) which is to be highlighted in the lyric window 46 by the MIDI player device at the time specified by (x). The Length field stores the number of text characters stored in the lyric field. The computer 12 uses the value stored in the length field to determine how may lyric characters to highlight when the lyric instruction is executed. The Flags field stores values used by the computer 12 to paginate the lyrics that are displayed in the lyric screen 46.

As a MIDI file is played back, note instructions 152 are sent to the sound card 18 or the MIDI device 30 when an output of the reference counter equals the count value (x) stored in the note instruction Delta field. Likewise, the lyrics, which are displayed on the lyric window 46, are highlighted when the reference counter equals the count value (x) stored in the lyric instruction Delta field.

In the Play mode, the rate at which the reference counter is incremented is based on the preset tempo of the MIDI file to be played back. That is, when a MIDI file is opened, the MIDI player device reads a tempo value from the MIDI file and configures the reference counter so as to increment at a corresponding rate. Thus, if the tempo value for the MIDI file is slower (e.g. 1.0 sec/QtrNote), the reference counter will increment at a correspondingly slower rate. If the tempo value for the MIDI file is faster (e.g. 0.5 sec/QtrNote), the reference counter will increment at a correspondingly faster rate.

In the Perform mode, the rate at which the reference counter is incremented is initially based on the preset tempo of the MIDI file to be played back. That is, when a MIDI file is opened, the MIDI player device reads the tempo value from the MIDI file and configures the reference counter so as to increment at the corresponding rate. The MIDI player device then plays back the Perform mode lead-in taps at the preset tempo until a user begins tapping the keyboard 16. Once the MIDI player device detects key taps from the user, the tempo of the MIDI file being played back is adjusted to track the tempo established by the user tapping the keyboard 16 in either the Beat setting or the Melody setting. The tempo of the MIDI file is adjusted by varying the rate at which the reference counter is incremented as described further below.

Figure 5:
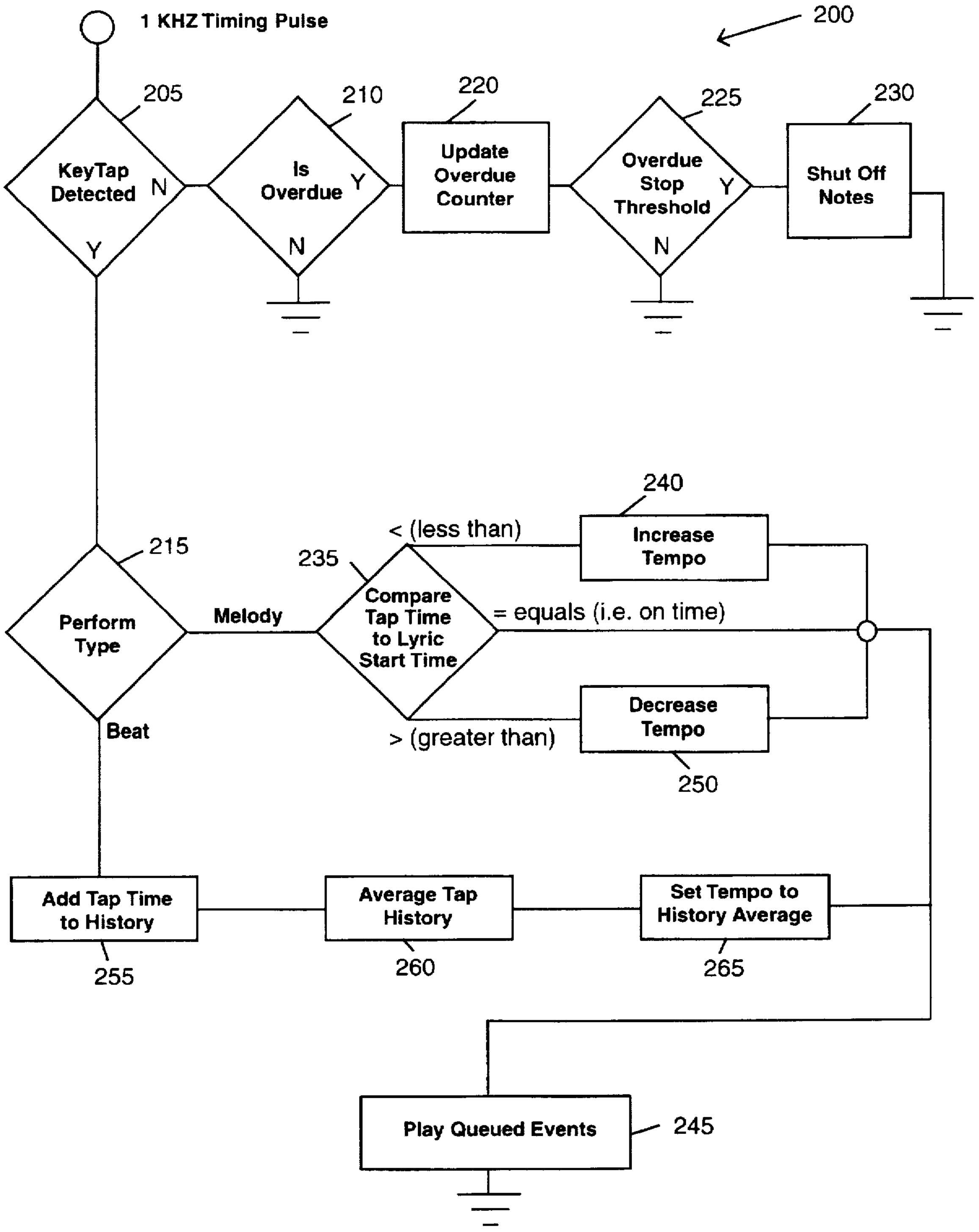
FIG. 5 is a flowchart setting forth an interrupt routine which adjusts the tempo of a MIDI file being performed so as to track or otherwise follow the tempo tapped on a keyboard by a user when the MIDI player device is operated in a Perform mode.

Referring now to FIG. 5, there is shown a flowchart which sets forth an exemplary interrupt routine 200 for adjusting the tempo of the MIDI file being performed so as to track or otherwise follow the tempo tapped on the keyboard 16 by a user when the MIDI player device is operated in the Perform mode. The interrupt routine 200 may be executed at a rate of approximately 1 KHz. That is, a central processor (CPU) of the computer 12 receives an interrupt request approximately 1000 times/second. The CPU services the interrupt request by executing the routine 200 so as to adjust, when necessary, the tempo of the MIDI file being played back.

The routine 200 begins at step 205 wherein a determination is made as to whether a user has tapped a key associated with the keyboard 16. If the result of step 205 is NO, the routine 200 advances to step 210 where a determination is made as to whether a keyboard tap is overdue relative to the tempo with which the user has previously been tapping the keyboard 16. The routine 200 averages the user's tap history and expects the next tap to occur when a specific value of the reference counter has been reached, based on the tap history.

If the result of step 210 is NO, the routine 200 ends because it is determined that a key tap has not been detected nor was a key tap expected at the present time, or more particularly, at the present count value of the reference counter. If the result of step 210 is YES, the routine advances to step 220 where an overdue counter is incremented. The routine then advances to step 225 where a determination is made as to whether the value stored in the overdue counter exceeds an overdue threshold value.

If the result of step 225 is NO, the routine 200 ends because it is determined that a key tap has not been detected, that the key tap is overdue, but the key tap is not so far overdue that playback of the MIDI file should be stopped (i.e. the user may simply be slowing down the tempo of the MIDI file being performed). If the result of step 225 is YES, the routine advances to step 230 where playback of the MIDI file is stopped because the delay in receiving a key tap has exceeded the predetermined threshold level. The present iteration of the routine 200 then ends after the playback of the MIDI file is stopped.

Returning to step 205, if the result of step 205 is YES, the routine 200 advances to step 215 where a determination is made whether a user selected the Melody setting (melody button 54) or the Beat setting (beat button 56). If the Melody setting has been selected, the routine 200 advances to step 235 where a determination is made as to whether the count value of the reference counter at the time that the key tap was detected in step 205 is either (1) less than, (2) greater than, or (3) equal to the count value (x) for the next lyric instruction to be executed.

If, in step 235, the count value of the reference counter at the time that the key tap was detected in step 205 is less than the count value (x) for the next lyric instruction 154 to be executed, then it is determined that the rate of key tapping by the user is increasing, and the routine 200 advances to step 240 where the tempo of the MIDI file being played back is increased. The tempo of the MIDI file is increased by increasing the rate at which the reference counter is incremented. The routine 200 then advances to step 245 so as to (1) send the next note instruction(s) 152 to be executed to the sound card 18 or MIDI device 30, and (2) highlight the lyric embedded in the next lyric instruction 154 to be executed.

If, in step 235, the count value of the reference counter at the time that the key tap was detected in step 205 is greater than the count value (x) for the next lyric to be highlighted, then it is determined that the rate of key tapping by the user is decreasing, and the routine 200 advances to step 250 where the tempo of the MIDI file being played back is decreased. The tempo of the MIDI file is decreased by decreasing the rate at which the reference counter is incremented. The routine 200 then advances to step 245 so as to (1) send the next note instruction(s) 152 to be executed to the sound card 18 or MIDI device 30, and (2) highlight the lyric embedded in the next lyric instruction 154 to be executed.

If, in step 235, the count value of the reference counter is equal to the count value (x) for the next lyric to be highlighted when the key tap was detected in step 205, then it is determined that the rate of key tapping by the user has remained the same and no adjustment of the MIDI file tempo is necessary. Thus, the routine 200 advances directly to step 245 so as to (1) send the next note instruction(s) 152 to be executed to the sound card 18 or MIDI device 30, and (2) highlight the lyric embedded in the next lyric instruction 154 to be executed.

If it is determined in step 215 that the Beat setting has been selected, the routine 200 advances to step 255 where the an increment value ($Y_O$) is determined by subtracting the count value ($C_{-1}$) of the reference counter the last time that a key tap was detected (during step 205 of a previous iteration of routine 200), from the count value ($C_O$) of the reference counter when a key tap was detected in step 205 of the present iteration of the routine 200 as shown in equation (1):

$$Y_0=C_0-C_{-1} \tag{1}$$

The value ($Y_O$) represents the number of times that the reference counter has been incremented since the last time that a key tap was detected. A value (Z) is then determined by adding the value ($Y_O$) to a number of values ($Y_{-T}$) which represent the number of times that the reference counter was incremented between the (T) most recent key taps detected during previous iterations of the routine 200 as shown in equation (2):

$$Z=Y_0+Y_{-1}+Y_{-2}+\ldots Y_{-T} \tag{2}$$

where $Y_O=C_O-C_{-1}$; $Y_{-1}=C_{-1}-C_{-2}$; $Y_{-2}=C_{-2}-C_{-3}$; and $Y_{-T}=C_{-T}-C_{-T}-C_{-T-1}$.

The routine 200 then advances to step 260 where a value (A) is determined by dividing the value (Z) determined in equation (2) by T+1 as shown in equation (3):

$$A=Z/(T+1); \tag{3}$$

where (A) represents an average number of counts between consecutive key taps for the past (T+1) key tap intervals. It should be appreciated that the value (T) may be set to any suitable number of previous key tap intervals without departing from the spirit of the present invention. However, in a preferred embodiment the value (T) may be set to a value in the range of about 2–8, and preferably 5. The routine 200 then advances to step 265 where the tempo of the MIDI file being played back is adjusted, when necessary, so as to track the rate of key tapping by the user. That is, the tempo of the MIDI file may be increased or decreased so as to track the average tempo tapped on the keyboard 16 by a user.

Thus, if the average number of counts between consecutive key taps for the last five (5) key taps has increased, the playback tempo of the MIDI file is increased by increasing the rate at which the reference counter is incremented. If the average number of counts between consecutive key taps for the last five (5) key taps has decreased, the playback tempo of the MIDI file is decreased by decreasing the rate at which the reference counter is incremented. If the average number of counts between consecutive key taps for the last five (5) key taps has remained the same, the playback tempo of the MIDI file is not adjusted in step 265.

By way of example, Table 1 shows the calculations which are performed in steps 255 and 260 of the routine 200 for three consecutive key taps where (T) is set equal to five (5), and the user is purposefully or inadvertently slowing down the rate at which the keyboard 16 is tapped. In particular, Table 1 shows that the routine 200 determines the number of counts ($Y_0$) that have occurred between the present key tap and the last key tap, adds ($Y_0$) to the (T) most recent ($Y_{-T}$) values, and then divides the result by T+1 in order to determine an average value (A) indicative of the average number of counts that have occurred between the (T) most recent key taps. As shown in Table 1, the above described trending algorithm indicates that the user is slowing down the tempo of the song by decreasing the rate at which the keyboard is tapped.

TABLE 1

| ITERATION 1 | | ITERATION 2 | | ITERATION 3 | |
|---|---|---|---|---|---|
| $C_0 = 85$ | $Y_0 = 85 - 75 = 10$ | $C_0 = 94$ | $Y_0 = 94 - 85 = 9$ | $C_0 = 102$ | $Y_0 = 102 - 94 = 8$ |
| $C_{-1} = 75$ | $Y_{-1} = 75 - 64 = 11$ | $C_{-1} = 85$ | $Y_{-1} = 85 - 75 = 10$ | $C_{-1} = 94$ | $Y_{-1} = 94 - 85 = 9$ |
| $C_{-2} = 64$ | $Y_{-2} = 64 - 52 = 12$ | $C_{-2} = 75$ | $Y_{-2} = 75 - 64 = 11$ | $C_{-2} = 85$ | $Y_{-2} = 85 - 75 = 10$ |
| $C_{-3} = 52$ | $Y_{-3} = 52 - 39 = 13$ | $C_{-3} = 64$ | $Y_{-3} = 64 - 52 = 12$ | $C_{-3} = 75$ | $Y_{-3} = 75 - 64 = 11$ |
| $C_{-4} = 39$ | $Y_{-4} = 39 - 25 = 14$ | $C_{-4} = 52$ | $Y_{-4} = 52 - 39 = 13$ | $C_{-4} = 64$ | $Y_{-4} = 64 - 52 = 12$ |
| $C_{-5} = 25$ | $Y_{-5} = 25 - 10 = 15$ | $C_{-5} = 39$ | $Y_{-5} = 39 - 25 = 14$ | $C_{-5} = 52$ | $Y_{-5} = 52 - 39 = 13$ |
| $C_{-6} = 10$ | | $C_{-6} = 25$ | | $C_{-6} = 39$ | |
| | | $C_{-7} = 10$ | | $C_{-7} = 25$ | |
| | | | | $C_{-8} = 10$ | |
| $A = Z/(T + 1) = 75/6 = 12.5$ | | $A = Z/(T + 1) = 69/6 = 11.5$ | | $Z = Z(T + 1) = 63/6 = 10.5$ | |

Once a value of (A) has been determined, the tempo of the song is adjusted in step 265 by varying the rate at which the reference counter is incremented. That is, if the present value of (A) is less than the previous value for (A), the tempo of the song is decreased. Likewise, if the present value of (A) is greater than the previous value for (A), the tempo of the song is increased. After the tempo as been adjusted in step 265, the routine 200 advances directly to step 245 so as to (1) send the next note instruction(s) 152 to be executed to the sound card 18 or MIDI device 30, and (2) highlight the lyric embedded in the next lyric instruction 154 to be executed.

Figure 6:
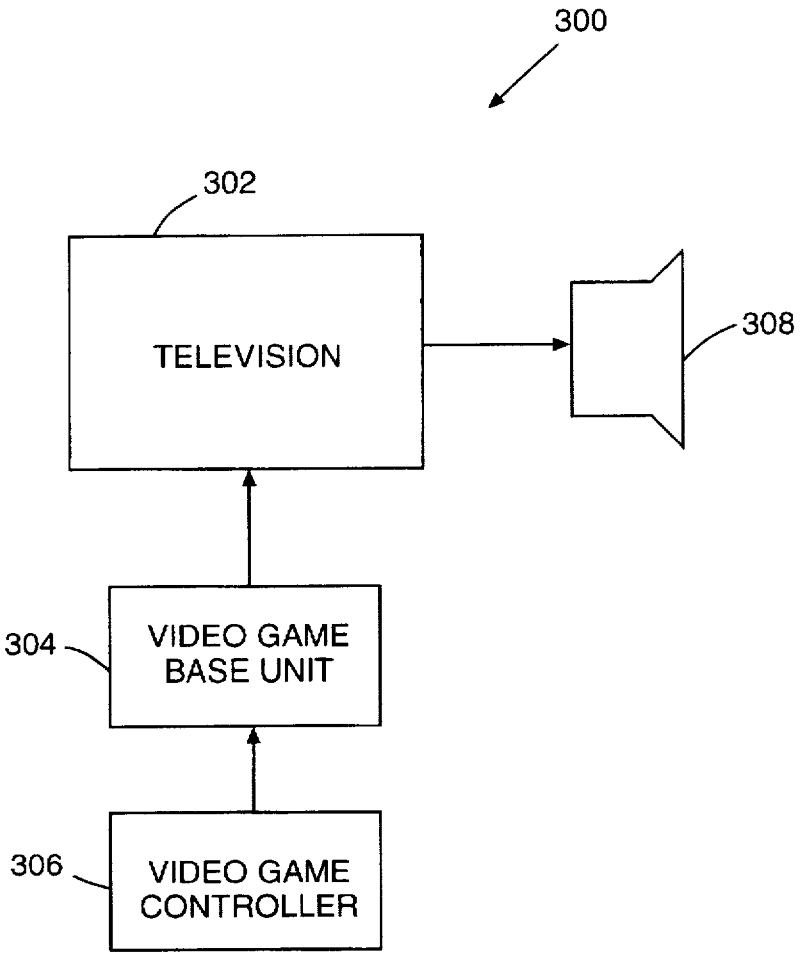
FIG. 6 is a block diagram of a MIDI player system which incorporates the features of the present invention therein.

Referring now to FIG. 6, there is shown a block diagram of a MIDI player system 300 which incorporates the features of the present invention therein. The MIDI player system 300 includes a conventional television set 302, a known video game base unit 304, and an associated video game controller 306. Exemplary video game base units are the Play Station™ video game player which is commercially available from Sony Corporation, and the Genesis II™ video game player which is commercially available from SEGA Corporation.

The base unit 304 may be conventionally connected to the television 302 through an RF connector associated with the television 302, or connected to the television 302 through a VIDEO IN jack and an AUDIO IN jack associated with the television 302. The base unit 304 is configured to function in the same manner as described above with regard to the general purpose computer 12 when the MIDI player software product of the present invention is executed thereon.

That is, the base unit 304 is adapted to receive storage media such as a CD ROM or game cartridge which has the above-described MIDI Player software product stored thereon. A number of MIDI files may also be stored on the storage media along with the MIDI player software product. When the MIDI player software product is executed, the base unit 304 is configured to function as the MIDI player device described above. In particular, a user may control the tempo and/or volume of a MIDI file that is played back by depressing one or more keys associated with the video game controller 306. The base unit 304 may convert the MIDI instructions to an analog format for playback through an audio speaker 308 associated with the television 302. If a karaoke MIDI file is played back, then the lyrics embedded in the MIDI karaoke file may be displayed on the television 302.

What has been described above is a MIDI player device which provides more than the ability to simply playback, or sing-along with a song. In particular, what has been described above is a MIDI player device software product which permits a user to interact with a computer system, such as a generally recognized personal computer or a video game base unit, during playback of a song such that the user may in fact perform the song by actually controlling the tempo and volume of the song as the song is played in real time.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

For instance, the MIDI player device described above may be executed on computers running different operating systems such as Microsoft-DOS, Microsoft-Windows, Macintosh OS, etc.

In addition, the present invention contemplates various other trending algorithms for adjusting the tempo of the song when the MIDI device player is operated in Perform mode.

It should also be appreciated that the sequence of instructions that define the MIDI player device of the present invention may be implemented in hardwired circuitry, by programming a general purpose processor, or by any combination of hardware and software.

What is claimed is:

1. A method for controlling a tempo of a MIDI file having a plurality of MIDI instructions stored on a computer-readable medium, comprising the computer-implemented steps of:

incrementing a counter at a first rate;

transferring one or more of the MIDI instructions to a general MIDI-compatible device at the first rate;

receiving an input signal from a data input device;

determining a first increment value when the input signal is received;

determining a first average value from the first increment value and a predetermined number of second increment values; and transferring one or more of the MIDI instructions to the general MIDI-compatible device at a second rate when the first average value has a predetermined logical relationship to a second average value.

2. The method of claim 1, wherein the step of determining a first increment value includes the steps of:

storing a present count value of the counter when the input signal is received; and subtracting a previous count value from the present count value to determine the first increment value.

3. The method of claim 2, wherein the step of determining a first average value includes the steps of summing the first increment value and the predetermined number of previous increment values together to determine a sum value; and dividing the sum value by the predetermined number to determine the first average value.

4. The method of claim 1, wherein the step of transferring one or more of the MIDI instructions to the general MIDI-compatible device at a second rate step includes the step of:

incrementing the counter at the second rate.

5. The method of claim 1, wherein the step of transferring one or more of the MIDI instructions to the general MIDI-compatible device at a second rate step includes the step of:

increasing the first rate when the first average value is greater than the second average value.

6. The method of claim 1, wherein the step of transferring one or more of the MIDI instructions to the general MIDI-compatible device at a second rate step includes the step of:

decreasing the first rate when the first average value is less than the second average value.

7. The method of claim 1, further including the step of:

transferring one or more of the MIDI instructions to the general MIDI-compatible device at the first rate when the first average value has a predetermined logical relationship to the second average value.

8. The method of claim 7, wherein the step of transferring one or more of the MIDI instructions to the general MIDI-compatible device at the first rate step includes the step of:

transferring one or more of the MIDI instructions to the general MIDI-compatible device at the first rate when the first average value is equal to the second average value.

9. The method of claim 1, further including the step of:

highlighting one or more text characters displayed on a display monitor at the first rate; and highlighting one or more of the text characters at the second rate when the first average value has a predetermined logical relationship to the second average value.

10. The method of claim 1, further including the steps of:

determining a characteristic of the input signal received from the data input device; and varying a volume level based on the characteristic of the input signal.

11. The method of claim 10, wherein the determining a characteristic of the input signal step includes the step of:

determining which key of the data input device was tapped by a user.

12. A method for controlling a tempo of a MIDI file having a plurality of MIDI instructions stored on a computer-readable medium, comprising the computer-implemented steps of:

incrementing a counter at a first rate;

transferring one or more of the MIDI instructions to a general MIDI-compatible device at the first rate;

receiving an input signal from a data input device;

determining a first count value of the counter when the input signal is received; and transferring one or more of the MIDI instructions to the general MIDI-compatible device at a second rate when the first count value has a predetermined logical relationship to a second count value associated with a lyric instruction to be executed.

13. The method of claim 12, wherein the step of transferring one or more of the MIDI instructions to the general MIDI-compatible device at a second rate step includes the step of:

incrementing the counter at the second rate.

14. The method of claim 12, wherein the step of transferring one or more of the MIDI instructions to the general MIDI-compatible device at a second rate step includes the step of:

increasing the first rate when the first count value is greater than the second count value.

15. The method of claim 12, wherein the step of transferring one or more of the MIDI instructions to the general MIDI-compatible device at a second rate step includes the step of:

decreasing the first rate when the first count value is less than the second count value.

16. The method of claim 12, further including the step of:

transferring one or more of the MIDI instructions to the general MIDI-compatible device at the first rate when the first count value has a predetermined logical relationship to the second count value.

17. The method of claim 16, wherein the step of transferring one or more of the MIDI instructions to the general MIDI-compatible device at the first rate step includes the step of:

transferring one or more of the MIDI instructions to the general MIDI-compatible device at the first rate when the first count value is equal to the second count value.

18. The method of claim 12, further including the step of:

highlighting one or more text characters displayed on a display monitor at the first rate; and highlighting one or more of the text characters at the second rate when the first count value has a predetermined logical relationship to the second count value.

19. The method of claim 12, further including the steps of:

determining a characteristic of the input signal received from the data input device; and varying a volume level based on the characteristic of the input signal.

20. The method of claim 19, wherein the determining a characteristic of the input signal step includes the step of:

determining which key of the data input device was tapped by a user.

21. A computer system configured to permit a user to control a tempo of a MIDI file having a plurality of MIDI instructions stored on a computer-readable medium, the computer system comprising:

a processor; and a memory coupled to said processor, said memory having stored therein a sequence of instructions which, when executed by said processor, cause said processor to perform the steps of:

incrementing a counter at a first rate;

transferring one or more of the MIDI instructions to a general MIDI-compatible device at the first rate;

receiving an input signal from a data input device;

determining a first increment value when the input signal is received;

determining a first average value from the first increment value and a predetermined number of second increment values; and transferring one or more of the MIDI instructions to the general MIDI-compatible device at a second rate when the first average value has a predetermined logical relationship to a second average value.

22. The computer system of claim 21, wherein said sequence of instructions cause said processor to perform the additional steps of highlighting one or more text characters displayed on a display monitor at the first rate; and highlighting one or more of the text characters at the second rate when the first average value has a predetermined logical relationship to the second average value.

23. The computer system of claim 21, wherein said sequence of instructions cause said processor to perform the additional steps of determining a characteristic of the input signal received from the data input device; and varying a volume level based on the characteristic of the input signal.

24. The computer system of claim 23, wherein said sequence of instructions cause said processor to perform the additional step of determining which key of the data input device was tapped by a user.

25. A computer system configured to permit a user to control a tempo of a MIDI file having a plurality of MIDI instructions stored on a computer-readable medium, the computer system comprising:

a processor; and a memory coupled to said processor, the memory having stored therein a sequence of instructions which, when executed by said processor, cause said processor to perform the steps of:

incrementing a counter at a first rate;

transferring one or more of the MIDI instructions to a general MIDI-compatible device at the first rate;

receiving an input signal from a data input device;

determining a first count value of the counter when the input signal is received; and transferring one or more of the MIDI instructions to the general MIDI-compatible device at a second rate when the first count value has a predetermined logical relationship to a second count value associated with a lyric instruction to be executed.

26. The computer system of claim 25, wherein said sequence of instructions cause said processor to perform the additional steps of:

highlighting one or more text characters displayed on a display monitor at the first rate; and highlighting one or more of the text characters at the second rate when the first count value has a predetermined logical relationship to the second count value.

27. The computer system of claim 25, wherein said sequence of instructions cause said processor to perform the additional steps of determining a characteristic of the input signal received from the data input device; and varying a volume level based on the characteristic of the input signal.

28. The computer system of claim 27, wherein said sequence of instructions cause said processor to perform the additional step of determining which key of the data input device was tapped by a user.

* * * * *